(12) United States Patent
Nishino et al.

(10) Patent No.: US 8,110,120 B2
(45) Date of Patent: Feb. 7, 2012

(54) METHOD OF MANUFACTURING A LIQUID CRYSTAL DISPLAY APPARATUS

(75) Inventors: Toshiharu Nishino, Hamura (JP); Yasushi Chiba, Iruma (JP); Masami Hara, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 757 days.

(21) Appl. No.: 11/881,226

(22) Filed: Jul. 26, 2007

(65) Prior Publication Data

US 2008/0023438 A1 Jan. 31, 2008

(30) Foreign Application Priority Data

Jul. 31, 2006 (JP) ................................. 2006-207602

(51) Int. Cl.
*C30B 33/00* (2006.01)
(52) U.S. Cl. ................. 216/23; 216/24; 216/89; 438/30
(58) Field of Classification Search .................... 216/23, 216/24, 89; 438/30
See application file for complete search history.

(56) References Cited

U.S. PATENT DOCUMENTS

| | | | |
|---|---|---|---|
| 6,197,209 B1 | 3/2001 | Shin et al. | |
| 6,248,395 B1 * | 6/2001 | Homola et al. | ............... 427/129 |
| 6,646,711 B2 | 11/2003 | Sugano | |
| 7,097,784 B2 | 8/2006 | Ogawa et al. | |
| 7,289,185 B2 | 10/2007 | Kawata et al. | |
| 2003/0038914 A1 * | 2/2003 | Kim et al. | ..................... 349/153 |
| 2004/0039471 A1 * | 2/2004 | Lin et al. | ....................... 700/121 |
| 2004/0065022 A1 * | 4/2004 | Machii et al. | .................... 51/309 |
| 2004/0233366 A1 * | 11/2004 | Kamosawa et al. | ........... 349/137 |
| 2006/0255014 A1 | 11/2006 | Ogawa et al. | |
| 2007/0205179 A1 * | 9/2007 | Nishino | ......................... 216/24 |

FOREIGN PATENT DOCUMENTS

| | | |
|---|---|---|
| JP | 2001-013489 A | 1/2001 |
| JP | 2002-087844 A | 3/2002 |
| JP | 2002-367954 A | 12/2002 |
| JP | 2004-175607 A | 6/2004 |
| JP | 2005-077945 A | 3/2005 |
| KR | 2003-0025792 | 3/2003 |
| KR | 2004-0060785 | 7/2004 |
| KR | 2005-0094719 | 9/2005 |
| TW | 543014 B | 7/2003 |
| TW | 200530661 A | 9/2005 |

OTHER PUBLICATIONS

Japanese Office Action (and English translation thereof) dated May 13, 2008, issued in a counterpart Japanese Application.
Korean Office Action (and English translation thereof) dated Mar. 26, 2008, issued in a counterpart Korean Application.

(Continued)

*Primary Examiner* — Binh X Tran
(74) *Attorney, Agent, or Firm* — Holtz, Holtz, Goodman & Chick, PC

(57) ABSTRACT

A method of manufacturing a liquid crystal display apparatus includes forming at least one assembly for forming a plurality of finished liquid crystal display apparatuses, by opposing two glass substrates to have a space therebetween and sealing a periphery of the space between the two glass substrates by an outer peripheral seal member. Outer surfaces of the two glass substrates are etched by soaking the assembly in an etching solution within an etching bath while maintaining a temperature and a concentration of the etching solution within the etching bath at a substantially constant temperature and at a substantially constant concentration. The etched outer surfaces of the glass substrates are flattened by polishing the outer surfaces of the glass substrates.

19 Claims, 17 Drawing Sheets

OTHER PUBLICATIONS

Chinese Office Action dated Aug. 8, 2008 and English translation thereof issued in counterpart Chinese Application No. 2007101371600.

Taiwanese Office Action dated Jun. 15, 2011 (and English translation thereof) in counterpart Taiwanese Application No. 096127717.

* cited by examiner

METHOD OF MANUFACTURING A LIQUID CRYSTAL DISPLAY APPARATUS

CROSS-REFERENCE TO RELATED APPLICATIONS

This application is based upon and claims the benefit of priority of prior Japanese Patent Application No. 2006-207602, filed Jul. 31, 2006, the entire contents of which are incorporated herein by reference.

BACKGROUND OF THE INVENTION

1. Field of the Invention

The present invention relates to a method of manufacturing a liquid crystal display apparatus.

2. Description of the Related Art

Conventionally, in a method of manufacturing a liquid crystal display apparatus, a first substrate and a second substrate, which are provided with a plurality of single-element seal members (each of which surrounds a region where a display element is formed), are bonded to each other with the single-element seal members, and then the two glass substrates are etched by soaking them in this state in an etching solution in an etching bath, thereby reducing the thickness of the two glass substrates is reduced (for example, refer to U.S. Pat. No. 6,197,209).

In this conventional manufacturing method, the temperature of the etching solution in the etching bath increases with the degree of progress of etching of the glass substrates, that is, with an increase in etching thickness of the glass substrates (an amount of the thickness of each of the glass substrates that is etched). Therefore, the time of finishing the etching, that is, of changing the thickness of the glass substrates to a desired thickness, is determined based on a result of detecting the temperature of the etching solution in the etching bath.

In this case, the etching speed depends on the temperature and the concentration of the etching solution in the etching bath. Therefore, if the initial temperature and the initial concentration of the etching solution vary, the temperature of the etching solution at the etching-finishing time, when the glass substrates have a desired thickness, varies.

Further, general methods of manufacturing a liquid display apparatus usually adopt a process in which an assembly is made by bonding two glass substrates, which have an area where a plurality of finished liquid crystal display apparatuses can be formed, with a plurality of single-element seal members, and batch processing is performed for a plurality of assemblies to increase productivity, by etching the plurality of assemblies simultaneously by soaking the assemblies in an etching solution in an etching bath.

In such batch processing, the increase in temperature of the etching solution in the etching bath with the progress of etching varies according to the number of batched assemblies soaked in the etching solution, and thus the temperature of the etching solution at the etching finishing time, when the glass substrates have a desired thickness, varies.

As described above, the temperature of the etching solution in the etching bath at the etching finishing time when the glass substrates have a desired thickness varies according to the initial temperature and the initial concentration of the etching solution and according to the number of batched assemblies. Therefore, preliminary experiments are performed according to these parameters, and the temperature of the etching solution at the etching finishing time is determined based on a result of the preliminary experiments.

The total number of parameters such as the initial temperature and the initial concentration of the etching solution and the number of batched assemblies is equal to the product of the numbers of individual independent parameters. Therefore, when the conventional technique described above is carried out, it is necessary to perform a large number of preliminary experiments, and an enormous amount of work is required. Further, the relationship between the temperature of the etching solution and the etching thickness of the glass substrates varies according to variation in the volume of the etching bath to be used and a change in the amount of etching solution to be used from the amount in the preliminary experiments. Thus, it is necessary to perform the above large number of preliminary experiments for each etching apparatus, requiring still more preliminary work.

Moreover, the surfaces of glass substrates originally have projections and depressions of an order of 1 μm or less. Therefore, only reducing the thickness of two glass substrates by etching increases projections and depressions of the order of 1 μm or less which originally exist on the surfaces of the glass substrates to relatively large projections and depressions of μm order. Therefore, reducing the thickness of the glass substrates causes cracking due to the relatively large projections and depression of μm order, and thus the glass substrates easily crack.

BRIEF SUMMARY OF THE INVENTION

The object of the present invention is to provide a method of manufacturing a liquid crystal display apparatus which reduces the number of parameters necessary for determining the time of finishing etching to reduce the thickness of two glass substrates bonded to each other, and which enables further flattening of the surfaces of the two glass substrates.

A method of manufacturing a liquid crystal display apparatus according to an aspect of the present invention includes: forming at least one assembly for forming a plurality of finished liquid crystal display apparatuses, by opposing two glass substrates to have a space therebetween and sealing a periphery of the space between the two glass substrates by an outer peripheral seal member; etching outer surfaces of the two glass substrates by soaking the assembly in an etching solution within an etching bath while maintaining a temperature and a concentration of the etching solution within the etching bath at a substantially constant temperature and at a substantially constant concentration; and flattening the etched outer surfaces of the glass substrates by polishing the outer surfaces of the glass substrates.

In addition, according to an aspect of the present invention, the assembly is soaked in the etching solution in the etching bath for a time corresponding to a desired etching thickness of the glass substrates.

Still further, according to an aspect of the present invention, the polishing is carried out by performing at least one of mechanical polishing and chemical mechanical polishing.

DETAILED DESCRIPTION OF THE INVENTION

Figure 1A:
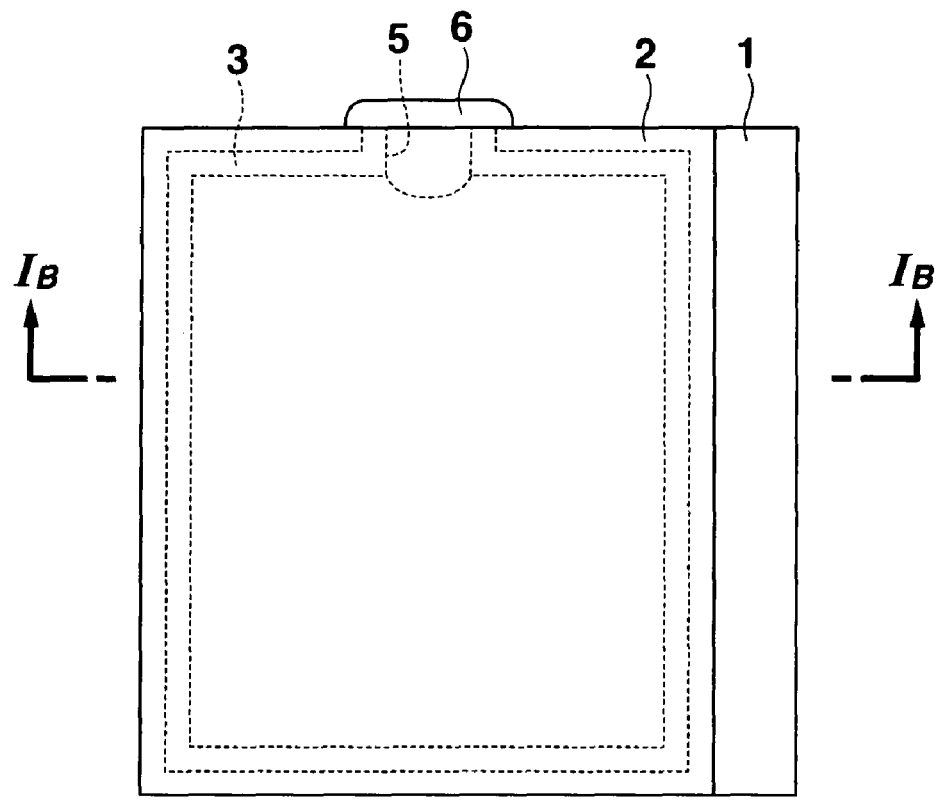
FIG. 1A is a plan view of an example of a liquid crystal display apparatus manufactured by a manufacturing method according to an embodiment of the present invention.
Figure 1B:
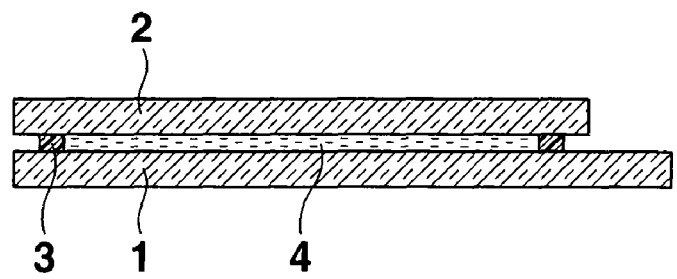
FIG. 1B is a cross-sectional view of the liquid crystal display apparatus taken along line IB-IB of FIG. 1A.

As shown in FIGS. 1A and 1B, a liquid crystal display apparatus includes two glass substrates 1 and 2 bonded by a single-element seal member 3 having an almost rectangular frame shape. Liquid crystal 4 is filled in an area between the glass substrates 1 and 2 and inside the single-element seal member 3 through a liquid crystal injection port 5 formed in the single-element seal member 3, and the liquid crystal injection port 5 is sealed by a sealing material 6. In this structure, as illustrated in FIG. 1B, one side portion of the lower glass substrate 1 projects farther than the upper glass substrate 2. Further, the thickness of the glass substrates 1 and 2 is relatively small, for example, 0.3 mm.

Next, an example of a manufacturing process of the liquid crystal display apparatus will be explained with reference to a manufacturing process flowchart of FIG. 2. First, in step S1 of FIG. 2, two glass substrates 1 and 2 are prepared. The glass substrates 1 and 2 have an area of a size in which a plurality (for example, 4×4=16) of finished liquid crystal display apparatuses can be formed (see FIG. 3). In this case, the thickness of the glass substrates 1 and 2 is relatively large, for example, 0.5 mm.

Figure 2:
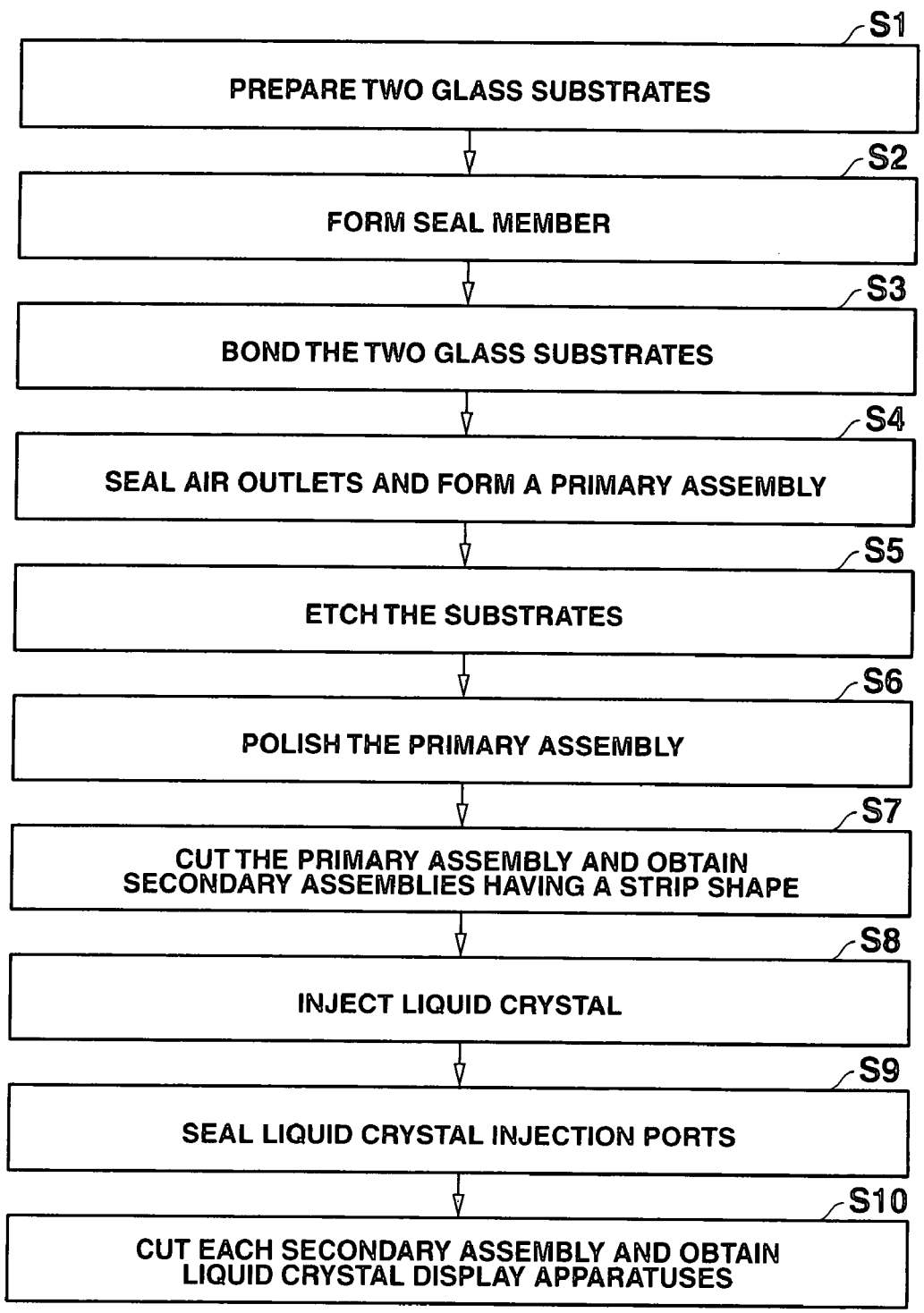
FIG. 2 is a flowchart of a manufacturing process of the liquid crystal display apparatus illustrated in FIG. 1.

Next, in step S2 of FIG. 2, a plurality of single-element seal members 3 each of which has an almost rectangular shape and which are formed of epoxy-based resin or the like are formed by screen printing on an upper surface of the lower glass substrate 1 in respective regions for forming respective liquid crystal display apparatuses. Simultaneously, an outer peripheral seal member 7 having an almost rectangular shape and also formed of epoxy-based resin is formed in an outer peripheral portion of the upper surface of the lower glass substrate 1. In this case, a liquid crystal injection port 5 serving as an inlet for injecting liquid crystal between the two glass substrates 1 and 2 as described below is formed in one part of each of the single-element seal members 3. Further, air outlets 8, which discharge a part of air between the two glass substrates 1 and 2 to the outside when the two glass substrates 1 and 2 are bonded to each other as described below, are formed in four parts of the outer peripheral seal member 7.

Next, in step S3 of FIG. 2, the two glass substrates 1 and 2 are superposed, and the single-element seal members 3 and the outer peripheral seal member 7 are softened by heating and thereafter are hardened. Thereby, the two glass substrates 1 and 2 are bonded to each other by the seal members 3 and 7. In this step, the air existing between the glass substrates 1 and 2 inside the outer peripheral seal member 7 expands by heat. Part of the heat-expanded air is discharged to the outside through the air outlets 8 of the outer peripheral seal member 7, and thereby breakage of the outer peripheral seal member 7 is prevented.

Next, in step S4 of FIG. 2, the air outlets 8 of the outer peripheral seal member 7 are sealed by sealing materials 9 formed of ultraviolet-cure epoxy denatured acrylic resin or the like. The article illustrated in FIG. 3, which has been through step S4 of sealing the air outlets, is hereinafter referred to as an assembly (primary assembly) 10.

Figure 4:
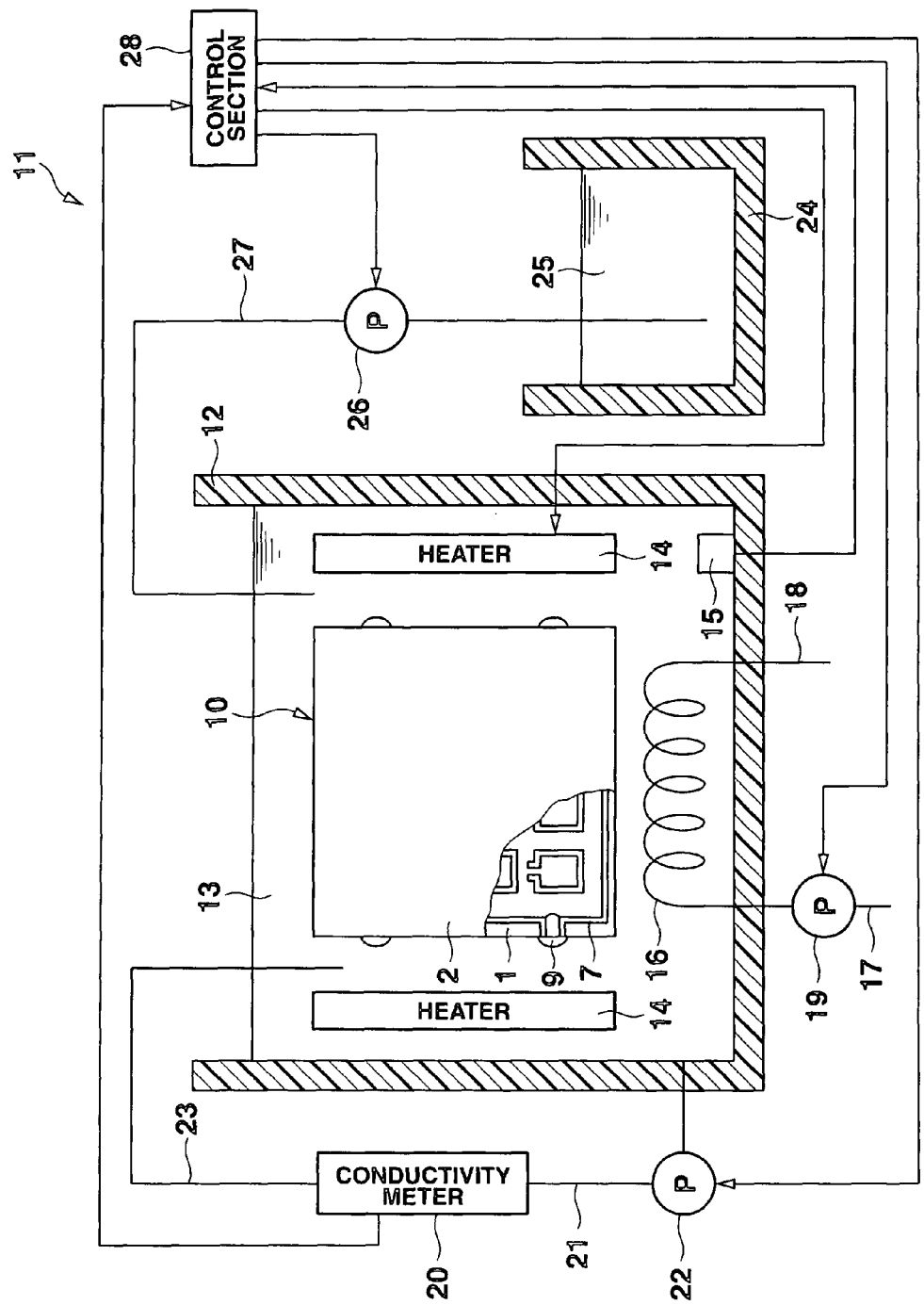
FIG. 4 is a schematic block diagram of an example of an etching apparatus.

Next, an etching apparatus 11 is prepared for etching, which is performed in step S5 of FIG. 2. FIG. 4 illustrates a schematic configuration of an example of the etching apparatus 11. The etching apparatus 11 has an etching bath 12. The etching bath 12 contains an etchant such as a hydrofluoric acid-based aqueous solution (hereinafter referred to as etching solution) 13 consisting of hydrofluoric acid, water and another component (catalyst which promotes etching reaction) or components as a glass-etching solution.

Heater or heaters 14, at least one temperature sensor 15, for example a thermocouple, and at least one cooling pipe 16 having a coil shape are provided in the etching bath 12. An inflow side and an outflow side of the cooling pipe 16 are connected to an inflow-side pipe 17 and an outflow-side pipe 18, respectively, which are extended to the outside of the etching bath 12. A cooling water pump 19 is provided in the inflow-side pipe 17 at the outside of the bath 12.

A conductivity meter 20 is provided outside the etching bath 12. Since there is a correlation between the conductivity of the etching solution 13 and the concentration of hydrofluoric acid contained in the etching solution 13, the concentration of hydrofluoric acid in the etching solution 13 can be measured by measuring the conductivity of the etching solution 13. An example of the structure of the conductivity meter 20 is explained below.

One end of a sampling pipe 21 is connected to an upstream end of the conductivity meter 20. The other end of the sampling pipe 21 is connected to a lower portion of the etching bath 12. A sampling pump 22 is provided in the sampling pipe 21. One end of an etching-solution recovery pipe 23 is connected to a downstream end of the conductivity meter 20. The other end of the recovery pipe 23 is disposed in an upper portion of the etching bath 12.

A supply tank 24 is provided outside the etching bath 12. The supply tank 24 contains hydrofluoric acid 25. The hydrofluoric acid in the supply tank 24 is timely supplied to the etching bath 12 through a supply pipe 27 including a supply pump 26, by driving the supply pump 26.

The temperature sensor 15 detects the temperature of the etching solution 13 in the etching bath 12, and supplies a temperature detection signal to a control section 28. The conductivity meter 20 detects the conductivity of the etching solution 13 supplied from the etching bath 12, and supplies a conductivity (concentration) detection signal to the control section 28. The control section 28 performs a calculation described below based on the detection signals, and controls driving of the heaters 14 and the respective pumps 19, 22 and 26.

Figure 5:
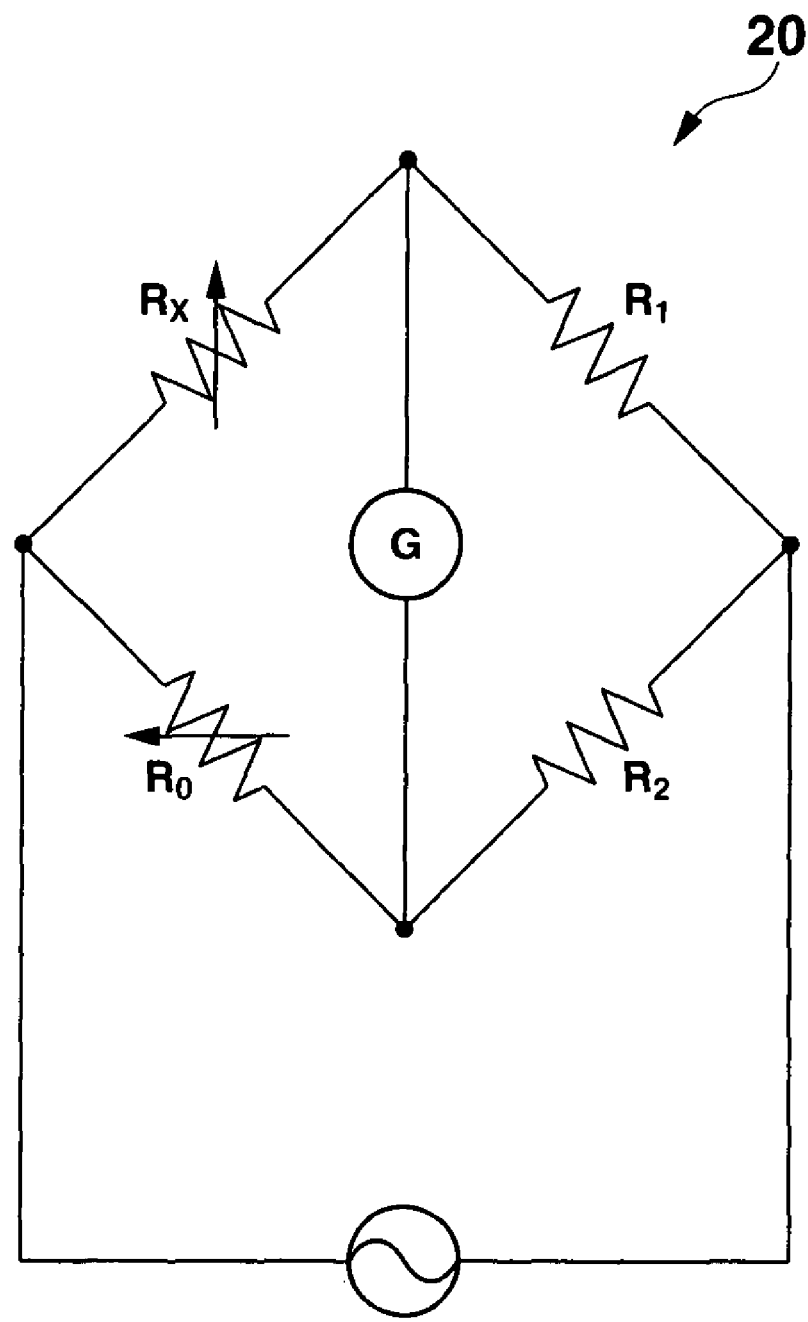
FIG. 5 is a diagram illustrating a part of a circuit that is an example of a conductivity meter.

FIG. 5 illustrates a part of a circuit that is an example of the conductivity meter 20. The circuit is a resistance-measuring circuit implementing a Wheatstone bridge. The circuit has a structure in which a measuring object, that is, a resistor $R_X$ of the etching solution 13, an internal variable resistor $R_0$ and internal fixed resistors $R_1$ and $R_2$ are connected to a galvanometer G in a bridge configuration. In this structure, $R_1$ is equal to $R_2$.

In the conductivity meter 20, first, as preliminary experiments, the internal variable resistor $R_0$ is adjusted such that current flowing through the galvanometer G becomes zero, in the state where an experimental etching solution having a known resistance value $R_X$ is supplied, and thereby the state of $R_0 = R_X$ is obtained. Next, when the etching solution 13 to be measured is supplied in the state of $R_0 = R_X$, the current flowing through the galvanometer G is changed to I, and thereby the resistors $R_1$ and $R_2$ are supplied with current i of the same magnitude. When I/i is sufficiently smaller than 1, it can be regarded that resistance change $\Delta R$ of $R_X$ is proportional to I. Therefore, the resistance of the etching solution 13 to be measured is determined from the expression "$R_X = R_0 + \Delta R$", and thus both the resistivity and the conductivity which is the reciprocal of the resistivity are obtained as described below.

Figure 6:
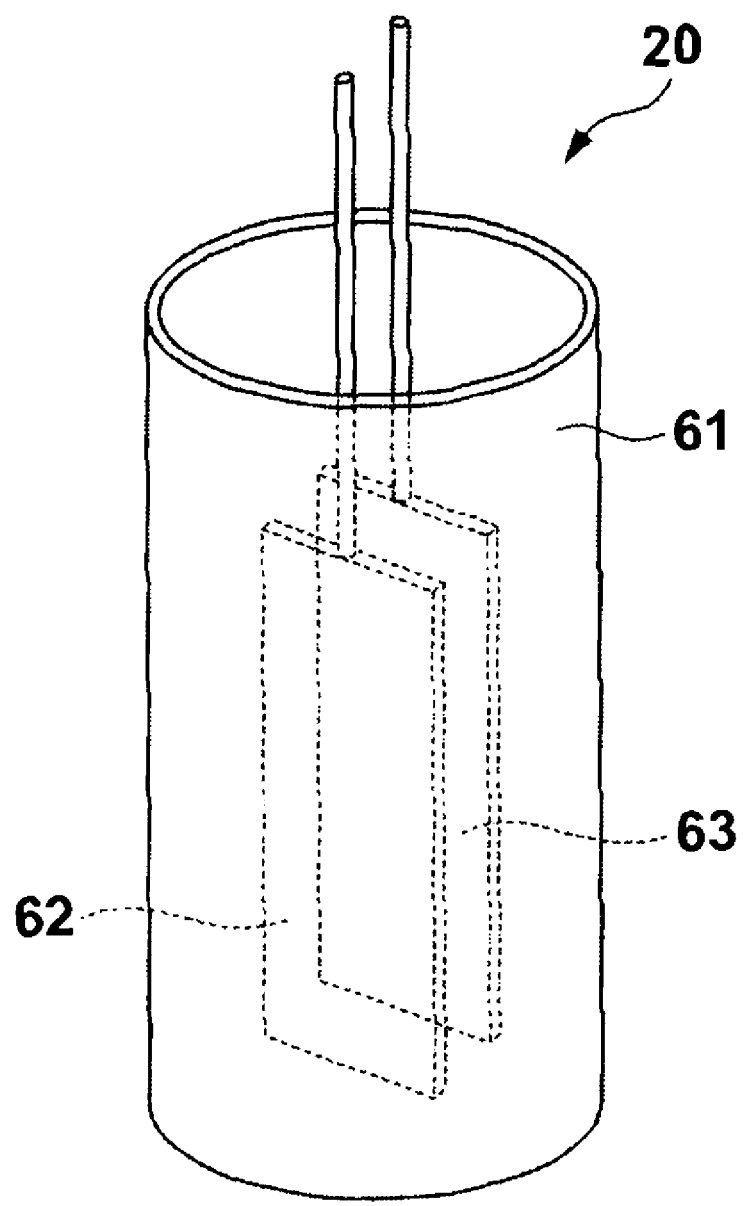
FIG. 6 is a perspective view of a part of another example of the conductivity meter.

FIG. 6 is a perspective view of a part of another example of the conductivity meter 20, illustrating an example of means for measuring the above resistance $R_X$. The conductivity meter 20 has a structure in which a pair of strip electrodes 62 and 63 formed of platinum, carbon or the like are provided in a cylindrical case 61 formed of fluorine resin or the like, and the electrodes 62 and 63 are spaced from and opposed to each other. When current flows between the electrodes 62 and 63 in the state where the etching solution 13 is supplied in the case 61, the resistance of the etching solution 13 interposed between the electrodes 62 and 63 is determined by Ohm's law. The conductivity κ in this case is determined from the below expression (1). In this expression, ρ represents the resistivity of the etching solution 13, R represents the measured resistance of the etching solution 13, D represents a distance between the electrodes 62 and 63, and S represents an opposed area of the electrodes 62 and 63.

$$\kappa = 1/\rho = D/(RS) \quad (1)$$

Next, control of the temperature of the etching solution 13 in the etching bath 12 of the etching apparatus 11 illustrated in FIG. 4 will be explained. When the temperature of the etching solution 13 in the etching bath 12 is detected by the temperature sensor 15, a temperature detection signal is supplied from the temperature sensor 15 to the control section 28. The control section 28 determines whether the temperature of the etching solution 13 in the etching bath 12 is less than a set temperature (for example, 60±1° C.), based on the temperature detection signal supplied from the temperature sensor 15. When the temperature is less than the set temperature, the control section 28 drives the heaters 14 to heat the etching solution 13 in the etching bath 12 to the set temperature.

On the other hand, when the temperature of the etching solution 13 in the etching bath 12 increases with the progress of etching and becomes higher than the set temperature, the control section 28 determines that the temperature of the etching solution 13 in the etching bath 12 has become higher than the set temperature. Then, the control section 28 drives the cooling water pump 19 to supply cooling water via the inflow-side pipe 17 to the cooling pipe 16 to cool the etching solution 13 in the etching bath 12 to the set temperature.

In particular, drive control of the heaters 14 may be performed by the proportional integral differential (PID) control method. PID control is a control method using a combination of proportional control, integration control, and differential control, and thereby realizes fine and smooth control. In particular, in the state where the temperature of the etching solution 13 in the etching bath 12 is maintained at a certain temperature, if the temperature of the etching solution 13 is rapidly lowered due to disturbances such as soaking of the assembly 10 or supply of the hydrofluoric acid 25 as described below, it is possible to return the temperature to the set temperature in a short time.

Next, control of the concentration of the etching solution 13 in the etching bath 12 will be explained. When the sampling pump 22 is driven, a part of the etching solution 13 in the etching bath 12 is supplied into the conductivity meter 20 through the sampling pipe 21. In this case, while the sampling pump 22 is driven, the etching solution 13 flows through the conductivity meter 20 at almost constant speed, and is returned to the etching bath 12 (recovered) through the etching-solution recovery pipe 23.

During the above step, the conductivity meter 20 detects the conductivity of the etching solution 13 supplied to the conductivity meter 20, and supplies a conductivity detection result or signal to the control section 28. The control section 28 determines whether the concentration of hydrofluoric acid in the etching solution 13 is less than a set concentration, on the basis of the conductivity detection result supplied from the conductivity meter 20. If the concentration is less than the set concentration, the control section 28 drives the supply pump 26 to supply the hydrofluoric acid 25 in the supply tank 24 to the etching bath 12 through the supply pipe 27 to increase the concentration of hydrofluoric acid in the etching bath 12 to the set concentration.

For example, if the etching solution 13 is a hydrofluoric acid-based aqueous solution that is 80% hydrofluoric acid, 15% water, and 5% of another component (such as a catalyst promoting an etching reaction) or components, the concentration of hydrofluoric acid in the etching solution 13 is 80%, and the set concentration is 80±4%. The supply pump 26 is automatically stopped when a preset amount of hydrofluoric acid 25 determined based on experimental data is supplied to the etching bath 12.

Next, the operation of the etching apparatus illustrated in FIG. 4 is explained. In the state in which both the temperature and concentration of the etching solution 13 in the etching bath 12 are set to the set temperature and the set concentration, respectively, an assembly 10 (one assembly in this example) is soaked in the etching solution 13 of the etching bath 12. Thereby, the outer sides of the two glass substrates 1 and 2 of the assembly 10 are etched, and the thickness of each of the glass substrates 1 and 2 is gradually reduced.

The results of the preliminary experiments are explained below. The concentration of hydrofluoric acid in the etching solution 13 within the etching bath 12 was maintained at a constant concentration of 80±4%, and the temperature of the etching solution 13 within the etching bath 12 was maintained at a fixed temperature of 60, 40, and 25° C. (±1° in each case) in respective experiments. In this state, the glass substrates 1 and 2 of the assembly 10 were etched to research the relationship between the thickness of the glass substrates and the etching time. Thereby, the results illustrated in FIG. 7 were obtained. In the experiments, the initial thickness of the glass substrates 1 and 2 was set to about 0.5 mm.

Since the etching speed or rate in this case depends on both the temperature and the concentration of the etching solution 13, even when a plurality of assemblies 10 are simultaneously processed, that is, batch processing is performed, the etching speed of each assembly 10 is equal to the above etching speed of one assembly 10.

Figure 7:
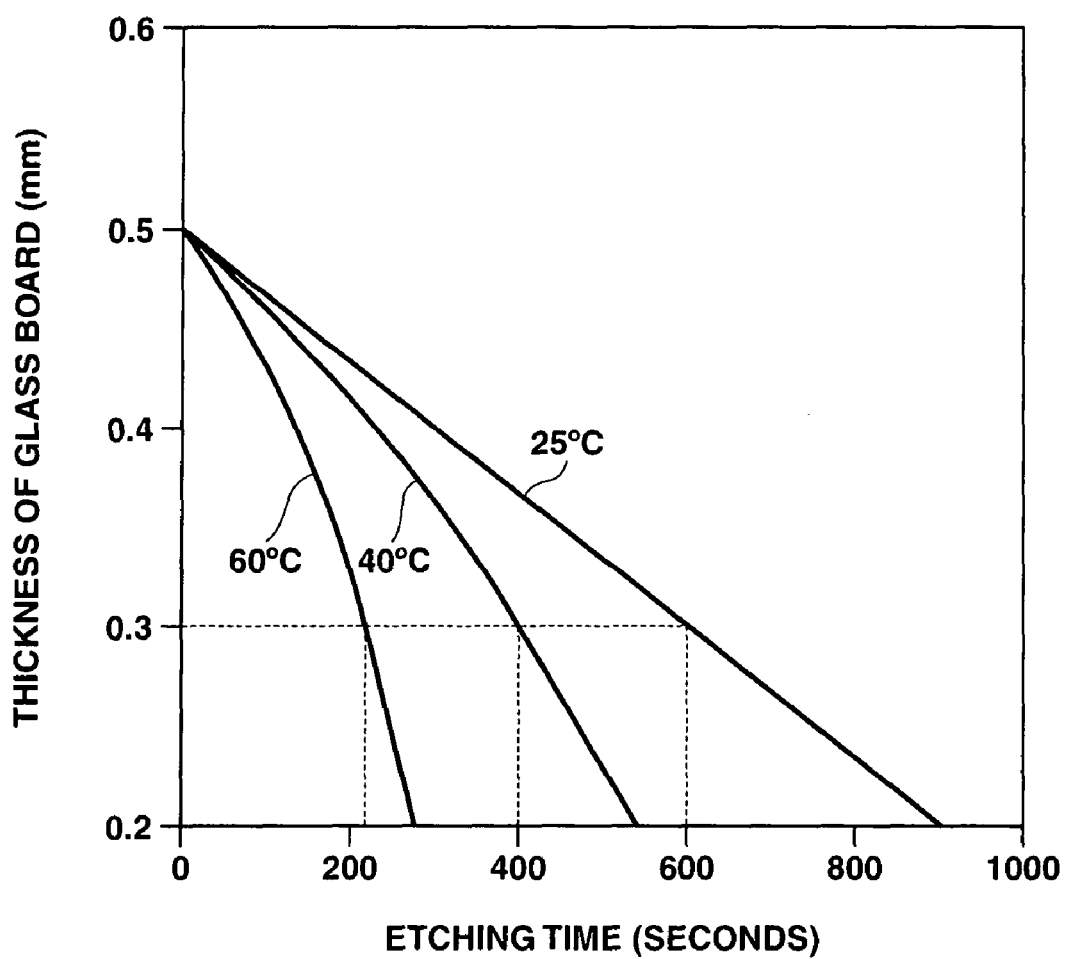
FIG. 7 is a diagram illustrating a relationship between thickness of glass substrates and etching time.

As is clear from FIG. 7, the etching speed increases as the temperature of the etching solution 13 increases, when the temperature of the etching solution 13 in the etching bath 12 is maintained at fixed temperatures of 60, 40, and 25° C. in the state where the concentration of the hydrofluoric acid in the etching solution 13 within the etching bath 12 is maintained at a fixed concentration of 80±4%. Under each of the above temperature conditions, the thickness of the glass substrates 1 and 2 is uniquely determined by the etching time or period.

As a result, if it is required to reduce the thickness of the glass substrates 1 and 2, having an initial thickness of about 0.5 mm, of one assembly 10 to about 0.3 mm, it is required that the assembly 10 is taken out of the etching solution 13 within the etching bath 12 to end etching after an etching time of about 210 seconds, about 400 seconds, and about 600 seconds with the temperatures of the etching solution 13 set at 60, 40 and 25° C., respectively. Thereby, the thickness of the glass substrates 1 and 2 can be reduced to about 0.3 mm under each of the above temperature conditions.

In this case, since both the temperature and the concentration of the etching solution 13 in the etching bath 12 are maintained at fixed values and the etching thickness of the glass substrates 1 and 2 of the assembly 10 is controlled by the etching time, only the etching time is used as a parameter to determine the amount of etching. This reduces the number of parameters necessary for determining the time of finishing etching for reducing the thickness of the glass substrates 1 and 2 of the assembly 10, and consequently reduces the number of preliminary experiments.

Specifically, if the set temperature of the etching solution 13 in the etching bath 12 is set to 60±1° C., a preliminary experiment should be performed only once in the state where the set concentration of the hydrofluoric acid in the etching solution 13 within the etching bath 12 is set to 80±4%. Thereby, the result at the temperature of 60° C. illustrated in FIG. 7 is obtained, and preliminary experiment is finished by performing only one experiment. If the set temperature is intended to be set to 40±1° C. and 25±1° C., as well, it suffices to perform two more preliminary experiments.

As described above, even if a plurality of assemblies 10 are simultaneously subjected to batch processing, the etching speed of each assembly 10 is the same as the above etching speed of one assembly 10. Therefore, the number of preliminary experiments is reduced also in this case.

Further, even if the volume of the etching bath 12 varies and the amount of the etching solution used for processing differs from that in the preliminary experiments, the etching thickness of the glass substrates 1 and 2 of the assembly 10 can be controlled by the etching time. Therefore, it is unnecessary to perform preliminary experiments for each etching bath 12.

In step S5 of FIG. 2, when the glass substrates 1 and 2 of the assembly 10 are etched and the thickness of the glass substrates 1 and 2 is reduced as described above, the assembly 10 is taken out of the etching solution 13 within the etching bath 12, and etching is finished.

As described above, the surfaces of the glass substrates 1 and 2 of the assembly 10 originally have projections and depressions of an order of 1 μm or less. Therefore, only etching the glass substrates 1 and 2 to reduce the thickness thereof increases the projections and depressions originally existing on the surfaces of the glass substrates 1 and 2, and makes them relatively large projections and depressions of μm order.

Figure 8:
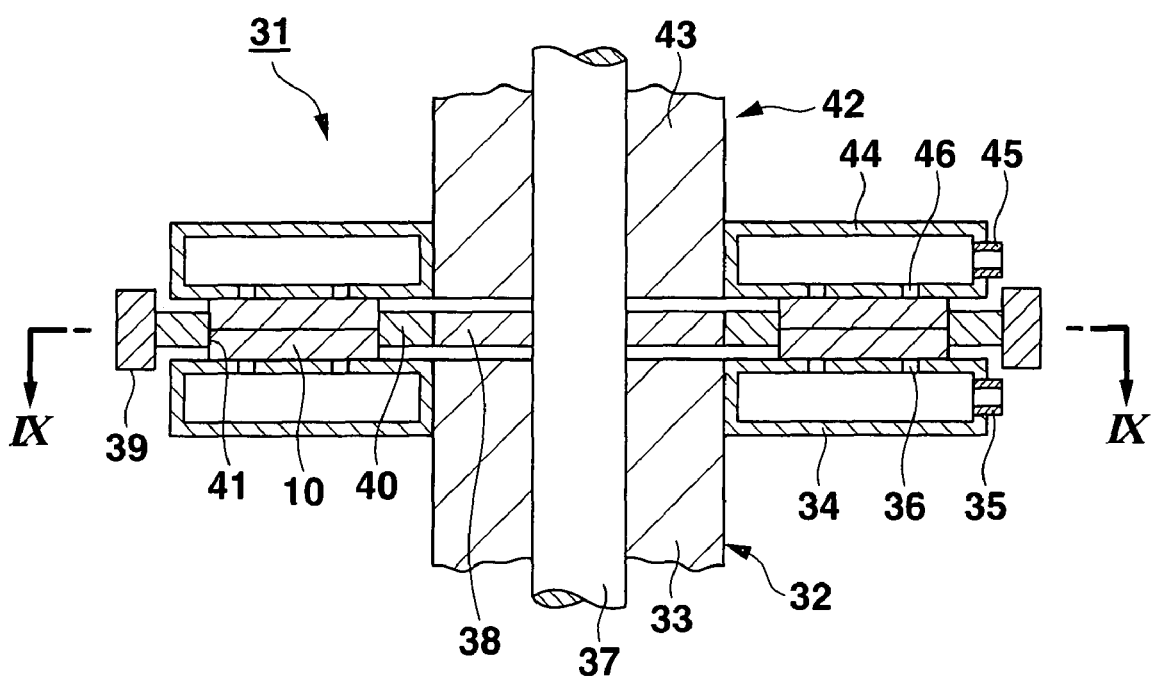
FIG. 8 is a vertical sectional view of a part of an example of a polishing apparatus.
Figure 9:
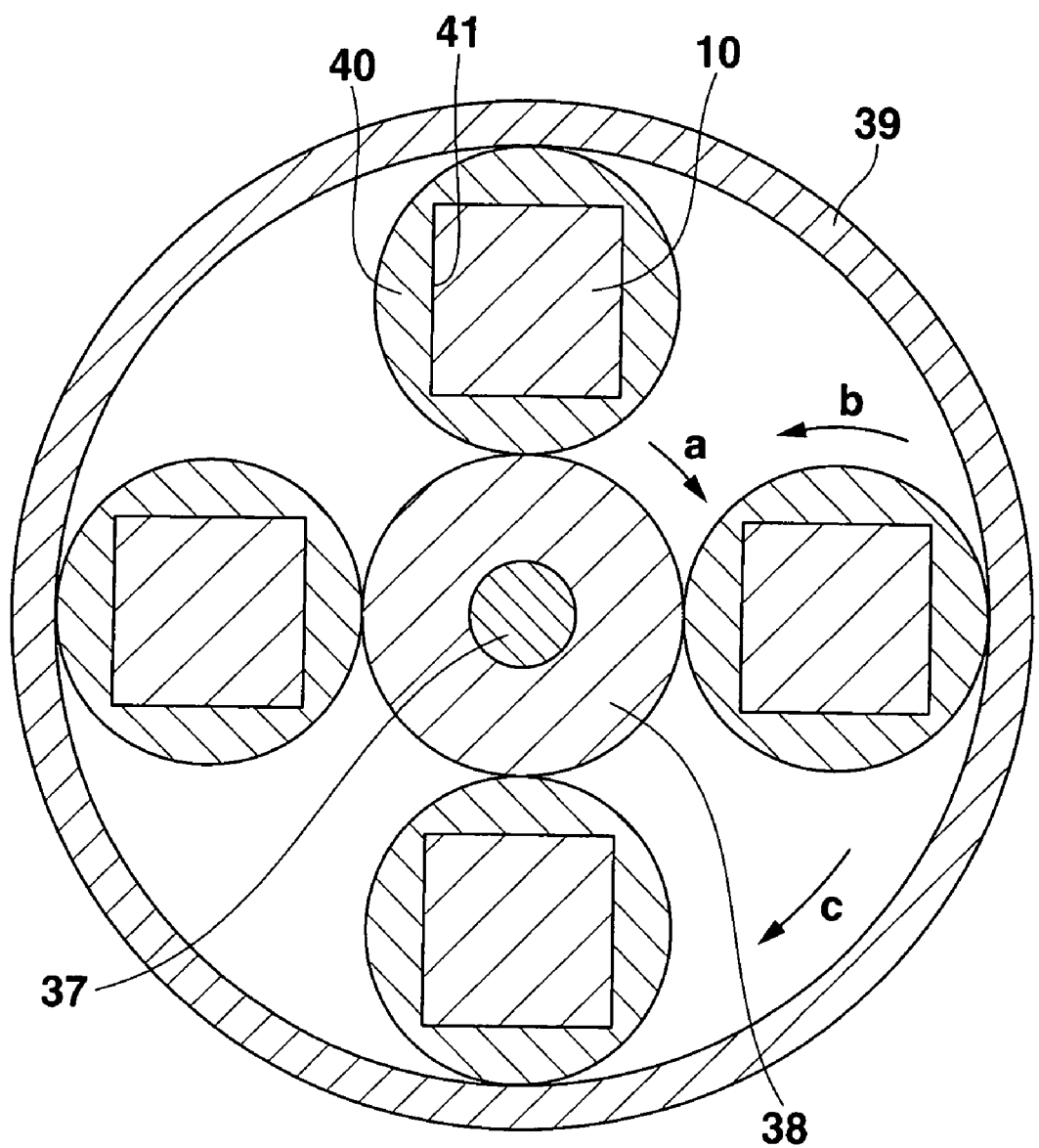
FIG. 9 is a cross-sectional view taken along line IX-IX of FIG. 8.

Thus, next, a polishing apparatus 31 is prepared to polish the assembly 10 in step S6 of FIG. 2. As shown in FIGS. 8 and 9, the polishing apparatus 31 is an upright two-surface polishing apparatus using a planetary gear mechanism, and has a lower polishing table unit 32 disposed and fixed in a housing (not shown).

The lower polishing table unit 32 has a structure in which: a hollow lower polishing table 34 having a flat circular shape is coaxially fixed around an upper part of a peripheral surface of a fixed cylindrical shaft portion 33, an inflow pipe 35 is provided on a peripheral side surface of the lower polishing table 34, and a plurality of outflow holes 36 are provided in a top wall of the lower polishing table 34. The inflow pipe 35 is connected with a supply pipe (not shown). When pure water including a polishing material is supplied inside the lower polishing table 34 through the supply pipe and the inflow pipe 35, the supplied pure water including the polishing material flows onto the top surface of the lower polishing table 34 through the outflow holes 36.

A rotary shaft 37 is inserted through the center portion (the cylindrical shaft portion 33) of the lower polishing table unit 32 such that the rotary shaft 37 is rotatable around its axis and not movable axially (along a direction of its axis). A sun gear 38 is fixed around a part of the rotary shaft 37 above the lower polishing table unit 32, so as to be slightly spaced from the top surface of the lower polishing table 34. An internal gear 39 is coaxially fixed around and distant from the sun gear 38. Four planet gears 40 are arranged between the sun gear 38 and the internal gear 39, and are detachable from the gears 38 and 39. A rectangular opening portion 41 having an internal side surface with almost the same dimensions as the external side surface of the assembly 10 is provided in the central portion of each planet gear 40 to receive the assembly 10. The thickness of the planet gears 40 is smaller than the thickness of the assemblies 10, such that the upper surfaces and the lower surfaces of the assemblies 10 contained in the respective opening portions 41 project to the upper side and the lower side of the planet gears 40.

An upper polishing table unit 42 is provided around a part of the rotary shaft 37 above the sun gear 38. The upper polishing table unit 42 is detachable from the rotary shaft 37 and is not rotatable. The upper polishing table unit 42 has a structure in which: a hollow upper polishing table 44 having a flat circular shape is provided around the lower peripheral surface portion of the cylindrical shaft portion 43, an inflow pipe 45 is provided on a peripheral side surface of the hollow upper polishing table 44 having a disc shape, and a plurality of outflow holes 46 are provided in a bottom wall of the upper polishing table 44. A supply pipe (not shown) is connected to the inflow pipe 45. When pure water including a polishing material is supplied to the inside of the upper polishing table 44 through the supply pipe and the inflow pipe 45, the supplied pure water including the polishing material flows out onto the bottom surface of the upper polishing table 44 through the outflow holes 46.

Next, operation of the polishing apparatus 31 is explained. First, upper surfaces and lower surfaces of the assemblies 10 received in the respective opening portions 41 of the planet gears 40 project to the upper side and the lower side of the planet gears 40, and abut against the bottom surface of the upper polishing table 44 and the top surface of the lower polishing table 34, respectively. In this state, as denoted by arrows a to c in FIG. 9, when the rotary shaft 37 rotates clockwise (arrow a) together with the sun gear 38, the planet gears 40 rotate about their axes counterclockwise (arrow b) together with the assemblies 10, and revolve clockwise (arrow c) around the sun gear 38.

In this state, pure water including polishing material is caused to flow out of the outflow holes 36 and 46 of the lower and upper polishing tables 33 and 44, and thereby the surfaces of the two glass substrates 1 and 2 of the assemblies 10 which rotate and revolve together with the planet gears 40 are polished. Since four planet gears 40 are provided in this example, batch processing for simultaneously polishing four assemblies 10 is performed.

Mechanical polishing is performed in this step if SiC, $Al_2O_3$, $SiO_2$ or C is used as the polishing material, and chemical mechanical polishing is performed if $CeO_2$ is used as the polishing material. In chemical mechanical polishing, $CeO_2$ reacts with water and promotes the release of bonding between Si and O of the glass substrates, and thereby the surfaces of the glass substrates are polished more finely than with mechanical polishing. The polishing step may be either mechanical polishing or chemical mechanical polishing. Further, a finishing step may be performed after a rough cutting step according to the size of the polishing material, in either mechanical polishing or chemical mechanical polishing. Furthermore, it is also possible to perform a rough cutting step by mechanical polishing, and to perform a finishing step by chemical mechanical polishing.

Since the assemblies 10 are polished in step S6 of FIG. 2 as described above, that is, mechanical polishing or chemical mechanical polishing is performed, the projections and depressions on the surfaces of the two glass substrates 1 and 2 of each assembly 10 are changed to relatively small projections and depressions of 0.1 μm order, even if the projections and depressions of the order of 1 μm or less originally existing on the surfaces of the glass substrates 1 and 2 are enlarged by etching to become relatively large projections and depressions of μm order. Thus, the surfaces of the two glass substrates 1 and 2 are further flattened, and breakage due to cracking caused by the projections and depressions is suppressed.

Next, in step S7 of FIG. 2, the two glass substrates 1 and 2 of the assembly 10 are cut, by using cutting means such as a glass cutter, along cutting lines 51 (indicated by one-dot dash lines in FIG. 10) running along and inside the right and left sides of the outer peripheral seal member 7 (the sides at which the sealing materials 9 are provided). Thereby, the left and right side portions provided with the sealing materials 9 are removed.

Figure 10:
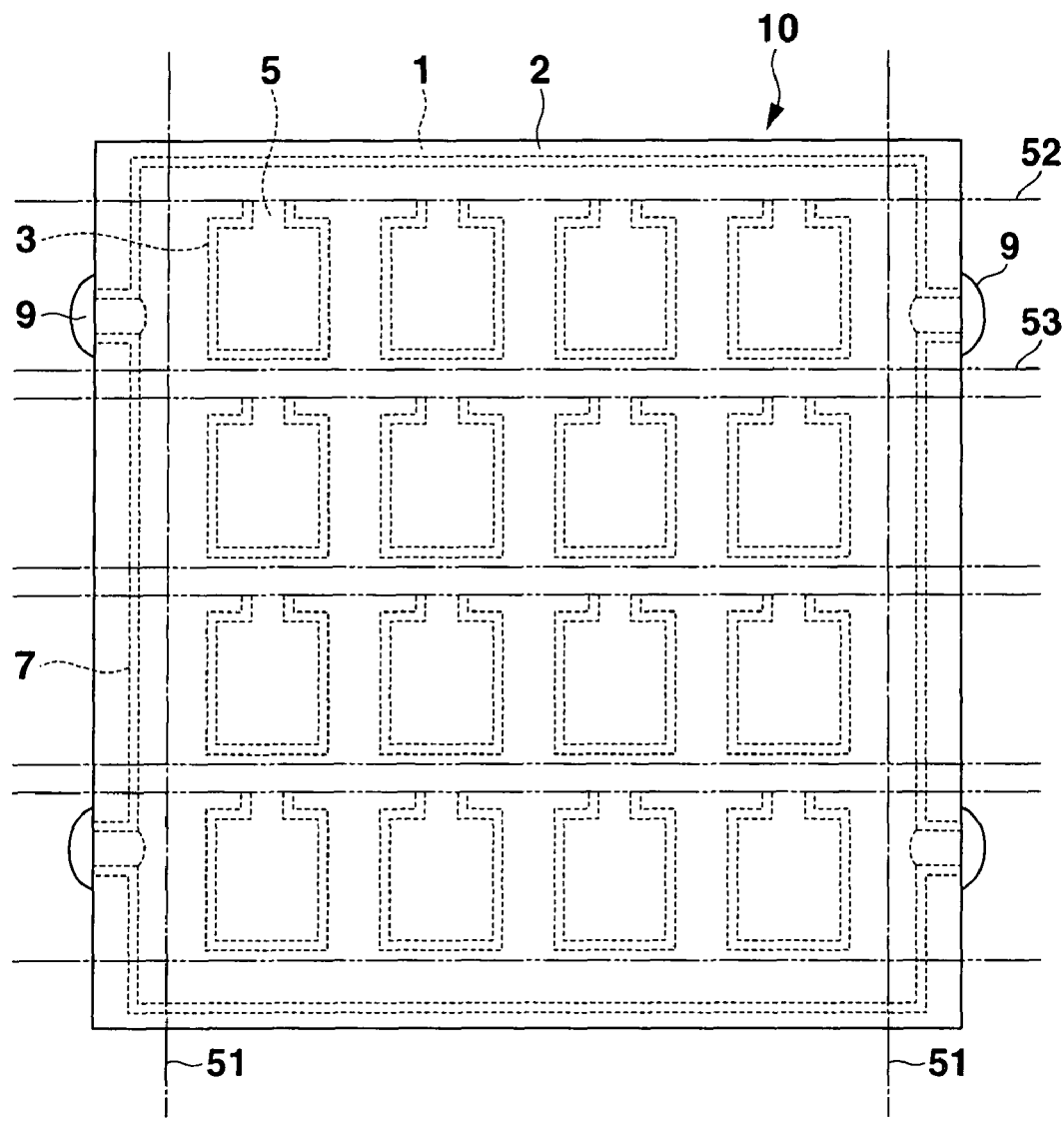
FIG. 10 is a plan view of an assembly for explaining step S7 of FIG. 2.

Next, the two glass substrates 1 and 2 are cut, by using cutting means such as a glass cutter, along cutting lines 52 and cutting lines 53 which are indicated by two-dot dash lines in FIG. 10. The cutting lines 52 run along tip portions of the liquid crystal injection ports 5 of the single-element seal members 3. The cutting lines 53 run along a portion outside and close to lower side portions of the single-element seal members 3 disposed on the opposite side of the liquid crystal injection ports 5.

Figure 11:
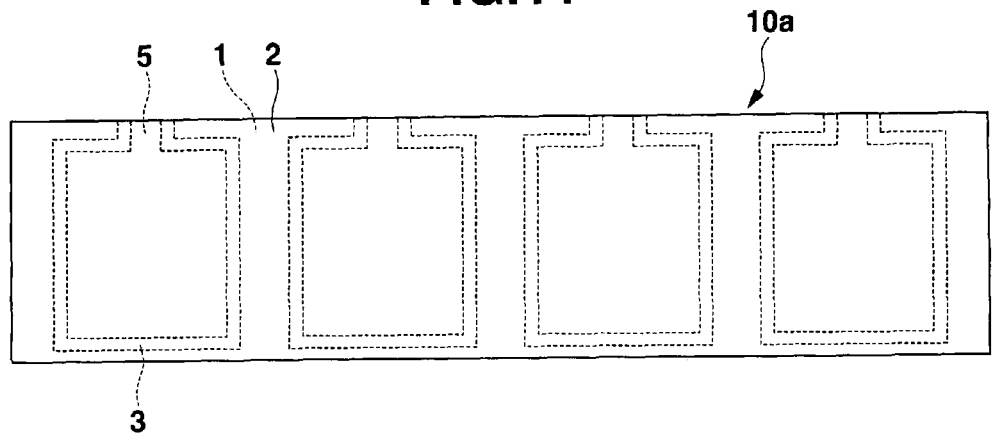
FIG. 11 is a plan view of a strip-shaped assembly obtained by step S7 of FIG. 2.

Thereby, four secondary elongated assemblies 10a are obtained. As illustrated in FIG. 11, each of the secondary assemblies 10a is formed of two glass substrates 1 and 2 bonded by four single-element seal members 3 arranged parallel to each other, and has a strip shape in which four finished liquid crystal display apparatuses can be formed. In this case, the assemblies 10a having a strip shape have a symmetrical shape.

Figure 3:
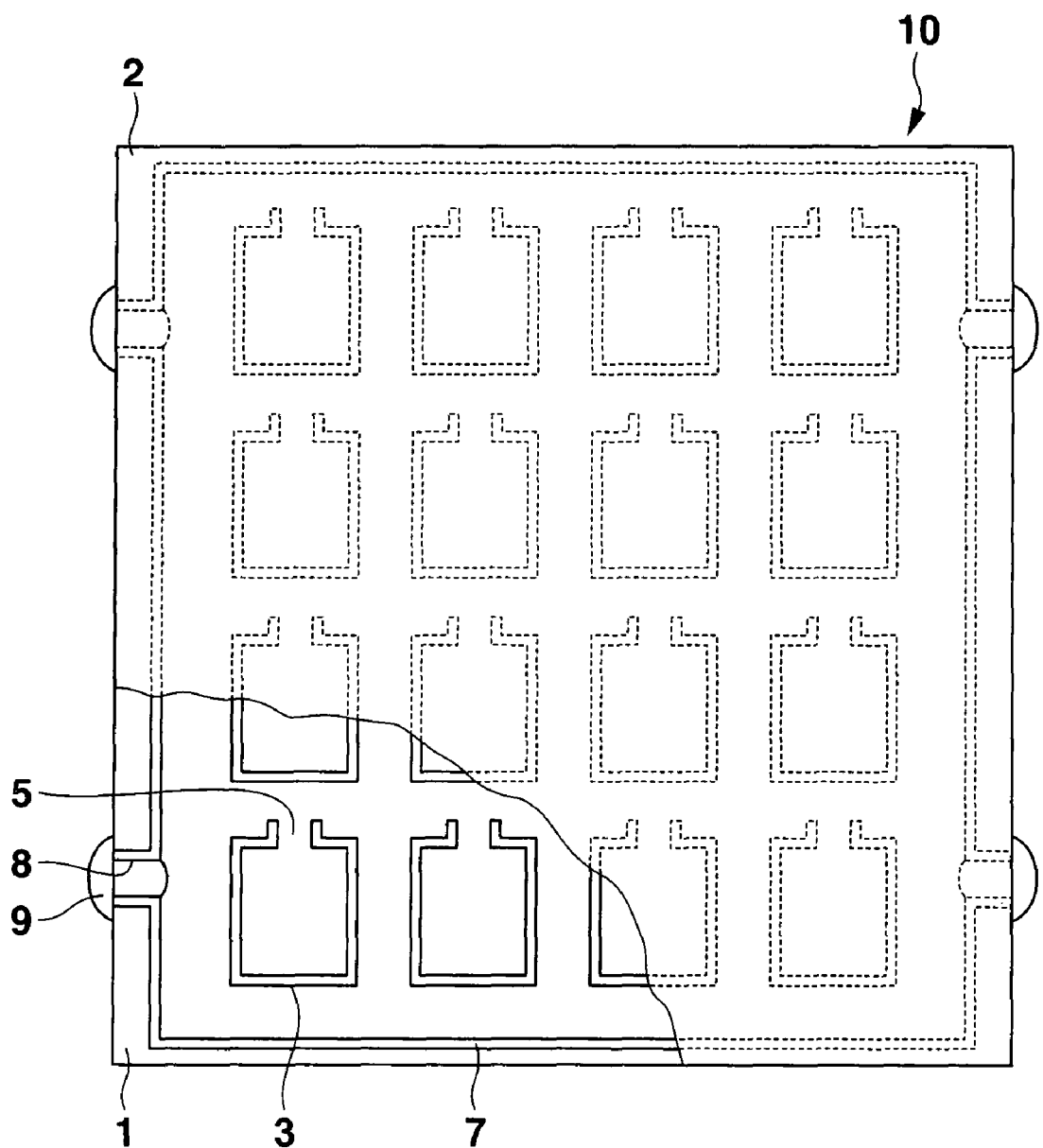
FIG. 3 is a plan view of an assembly, with a part thereof cut away, for explaining steps S1 to S4 of FIG. 2.

As explained above with respect to steps S3 and S4 of FIG. 2, the sealing material 9 is formed to seal the air outlets 8 after the glass substrates 1 and 2 are bonded by the single-element seal members 3. Therefore, as illustrated in FIG. 3, a part of the sealing material 9 projects from end surfaces of the glass substrates 1 and 2. Thus, if cutting along cutting lines 52, 53 indicated by two-dot dash lines is directly performed without performing cutting along the cutting lines 51 indicated by one-dot dash lines, end portions of the two glass substrates 1 and 2 (portions where the sealing material 9 exists) are not cut if the blade of the glass cutter collides with the sealing material 9. Thereby, cutting failure such as cracking may occur in the glass substrates 1 and 2. In comparison with this, in the aforementioned first cutting step, cutting along the cutting lines 51 indicated by the one-dot dash lines is performed first in FIG. 10 to remove the right and left side portions of the two glass substrates 1 and 2 provided with the sealing materials 9. Then, cutting along the cutting lines 52 and 53 indicated by the two-dots dash lines is performed to obtain secondary assemblies 10a having a strip shape. This easily prevents cutting failure such as cracking of the glass substrates 1 and 2.

Figure 12:
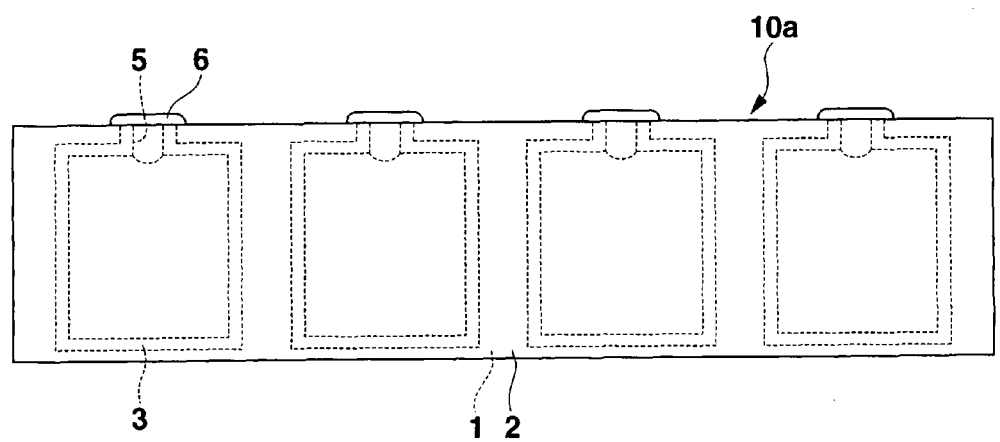
FIG. 12 is a plan view of a strip-shaped assembly for explaining step S9 of FIG. 2.

Next, in step S8 of FIG. 2, liquid crystal is injected into portions which are located between the glass substrates 1 and 2 and inside the four single-element seal members 3 of the strip secondary assembly 10a illustrated in FIG. 11, through the liquid crystal injection ports 5 of the single-element seal members 3. Next, in step S9 of FIG. 2, the liquid crystal injection ports 5 of the four single-element seal members 3 of the secondary assembly 10a are sealed by sealing materials 6, as illustrated in FIG. 12.

Figure 13:
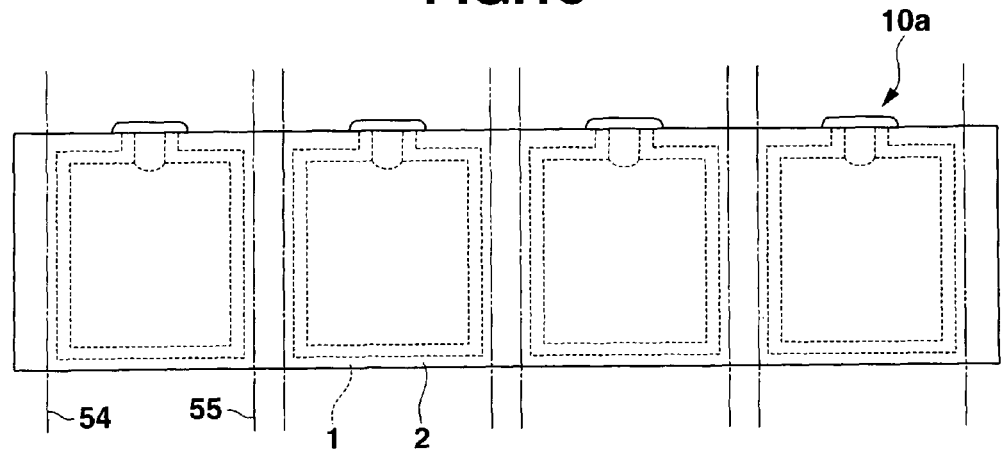
FIG. 13 is a plan view of a strip-shaped assembly for explaining step S10 of FIG. 2.

Thereafter, in step S10 of FIG. 2, the two glass substrates 1 and 2 are cut, by using cutting means such as a glass cutter, along cutting lines 54 indicated by one-dot dash lines in FIG. 13 which run along a line on the left side of and close to the single-element seal members 3. Further, only the upper glass substrate 2 is cut, by cutting means such as a glass cutter, along cutting lines 55 indicated by two-dots dash lines in FIG. 13 which along a line on the right side of and close to the single-element seal members 3. Thereby, liquid crystal display apparatuses having the structure illustrated in FIGS. 1A and 1B are obtained.

Figure 14:
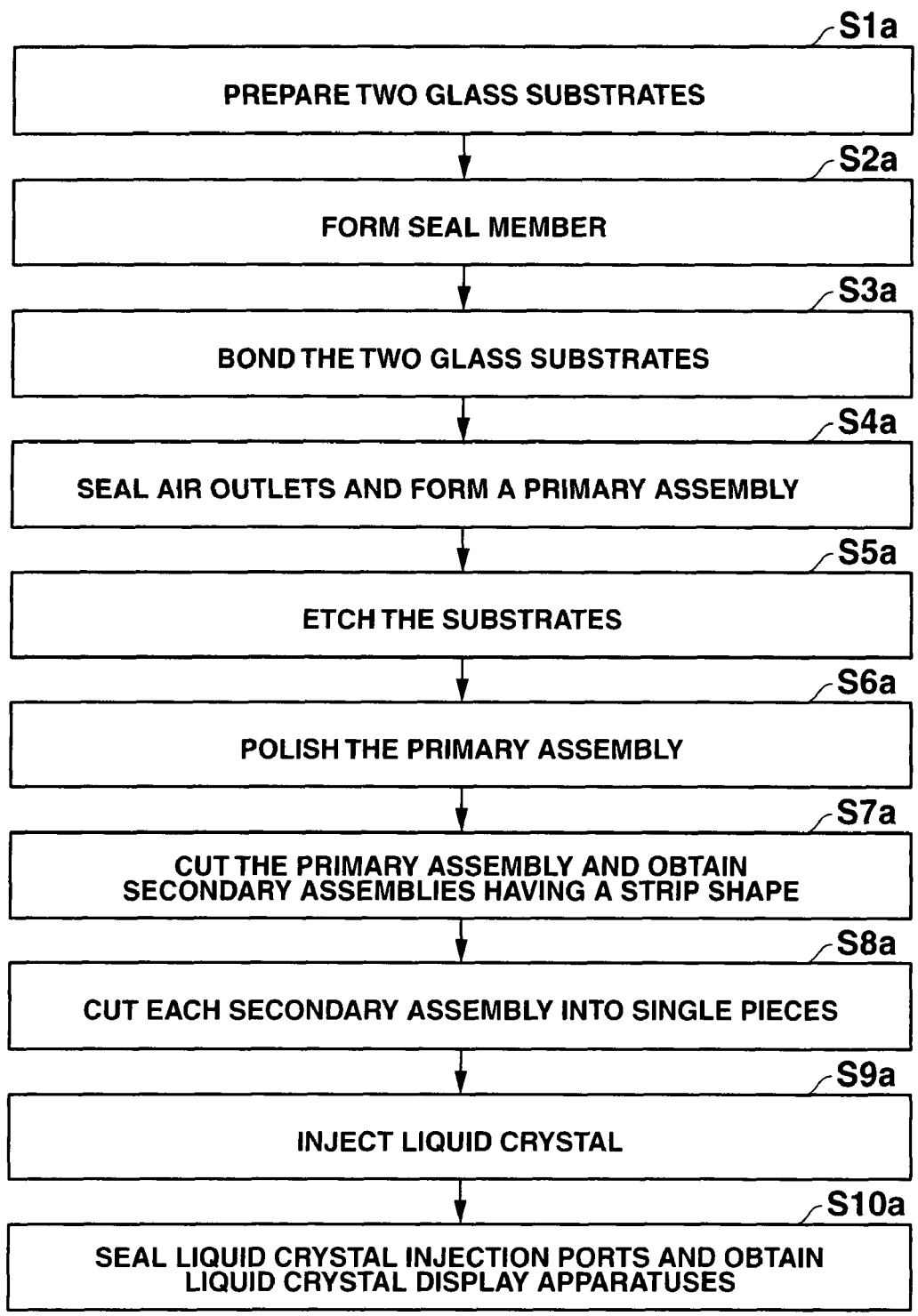
FIG. 14 is a flowchart illustrating another manufacturing process of the liquid crystal display apparatus illustrated in FIG. 1.

In the above method of manufacturing liquid crystal display apparatuses, cutting of the glass substrates 1 and 2 is finished (step S10) after injecting liquid crystal into the secondary assembly 10a (step S8). However, cutting may be finished before injecting liquid crystal, as illustrated in FIG. 14. In this process, steps S1a to S6a of FIG. 14 are the same as steps S1 to S6 of FIG. 2.

Figure 15:
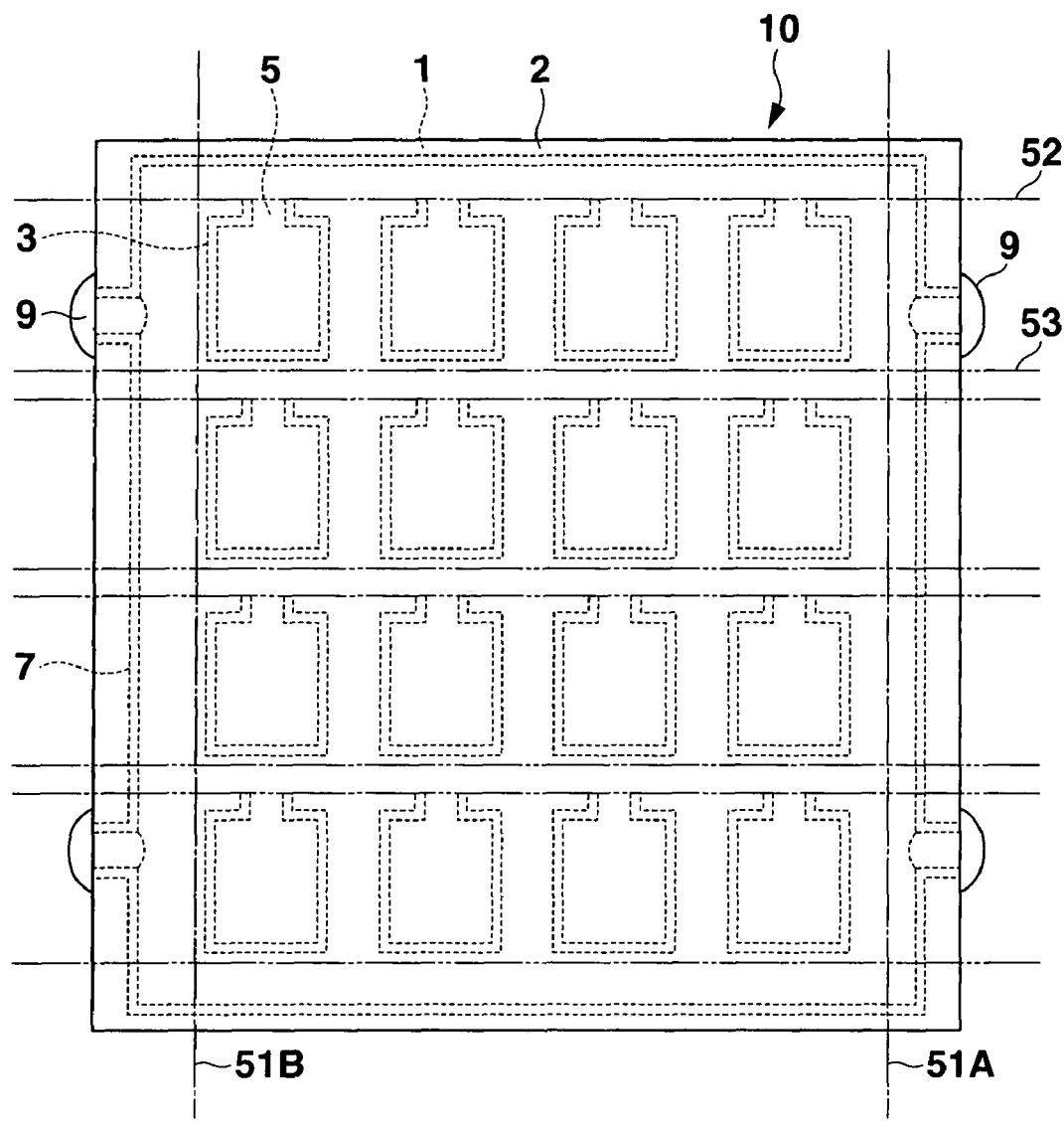
FIG. 15 is a plan view of an assembly for explaining step S7a of FIG. 14.
Figure 16:
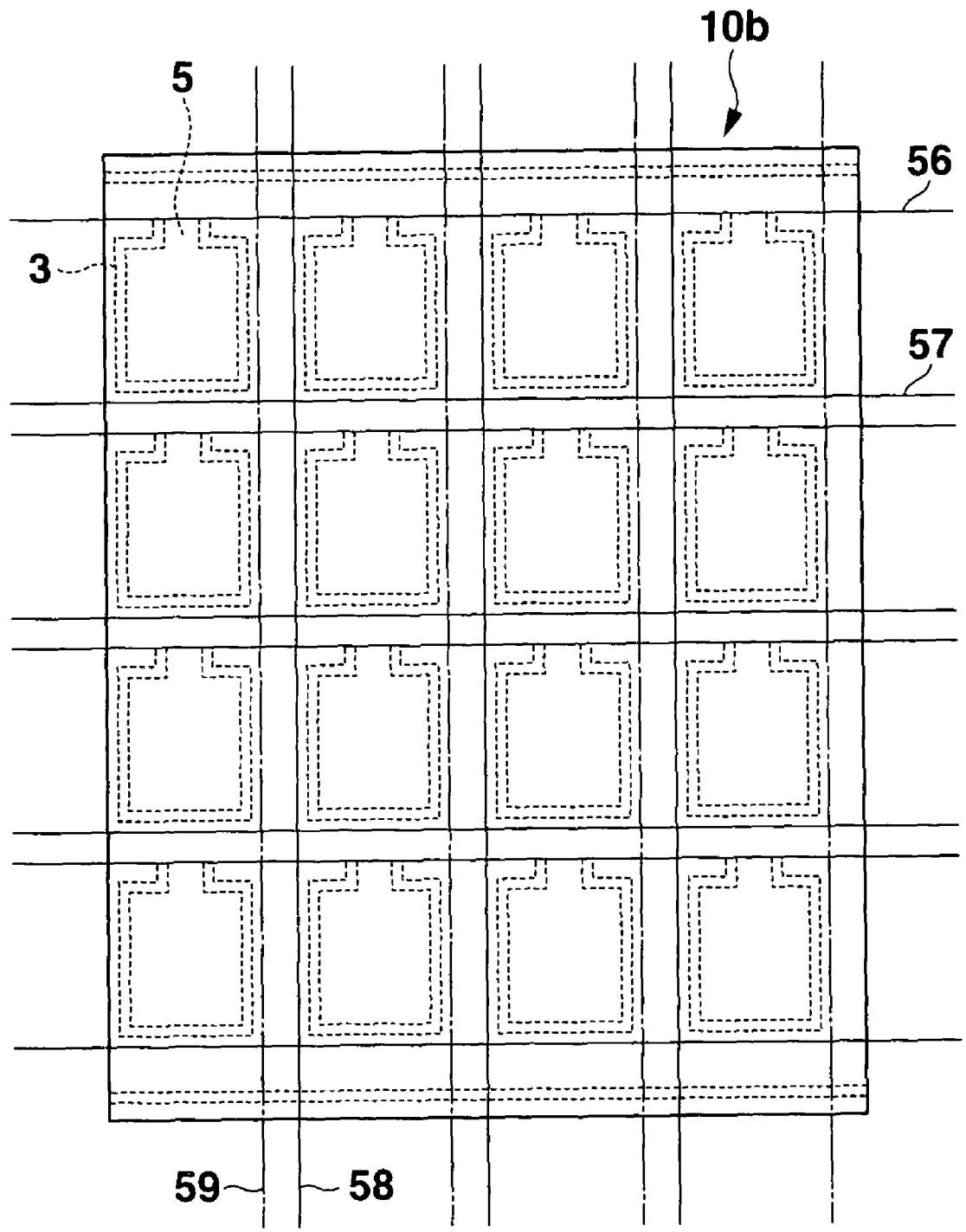
FIG. 16 is a plan view of an assembly for explaining step S8a of FIG. 14.

In step S7a of FIG. 14, the right side portion of the primary assembly 10 is cut along a right cutting line 51A (located in the same position as the right cutting line 51 of FIG. 10) indicated by a one-dot dash line, as illustrated in FIG. 15. Further, the left side portion of the assembly 10 is cut along a cutting line 51B (located more inside—that is, closer to the single-element seal members 3—than the left cutting line 51 of FIG. 10) running along a line on the left side of and close to the leftmost single-element seal members 3. Thereby, a cut assembly 10b illustrated in FIG. 16 is obtained. Next, the two glass substrates 1 and 2 are cut along cutting lines 56 and cutting lines 57 indicated by horizontal solid lines in FIG. 16. The cutting lines 56 run along tip portions of the liquid crystal injection ports 5 of the single-element seal members 3. The cutting lines 57 run along a line on the lower side (opposite to the liquid crystal injection ports 5) of and close to single-element seal members 3. Thereby, secondary assemblies having almost the same shape as the strip secondary assemblies 10a illustrated in FIG. 11 are obtained.

Next, in step S8a of FIG. 14, the two glass substrates 1 and 2 are cut along cutting lines 58 indicated by vertical solid lines in FIG. 16 which run along a line on the left side of and close to the single-element seal members 3. No cutting line 58 is provided at the left of the leftmost single-element seal members 3. Further, only the upper glass substrate 2 is cut along cutting lines 59 indicated by one-dot dash lines in FIG. 16 which run along a line on the right side of and close to the single-element seal members 3, and thereby the assembly is cut into single pieces, that is, tertiary assemblies. Thereafter, liquid crystal is injected into the two glass substrates 1 and 2 of the tertiary assemblies in step S9a, and the liquid crystal injection ports are sealed in step S10a. Thereby, liquid crystal display apparatuses having the structure illustrated in FIGS. 1A and 1B are obtained.

Figure 17:
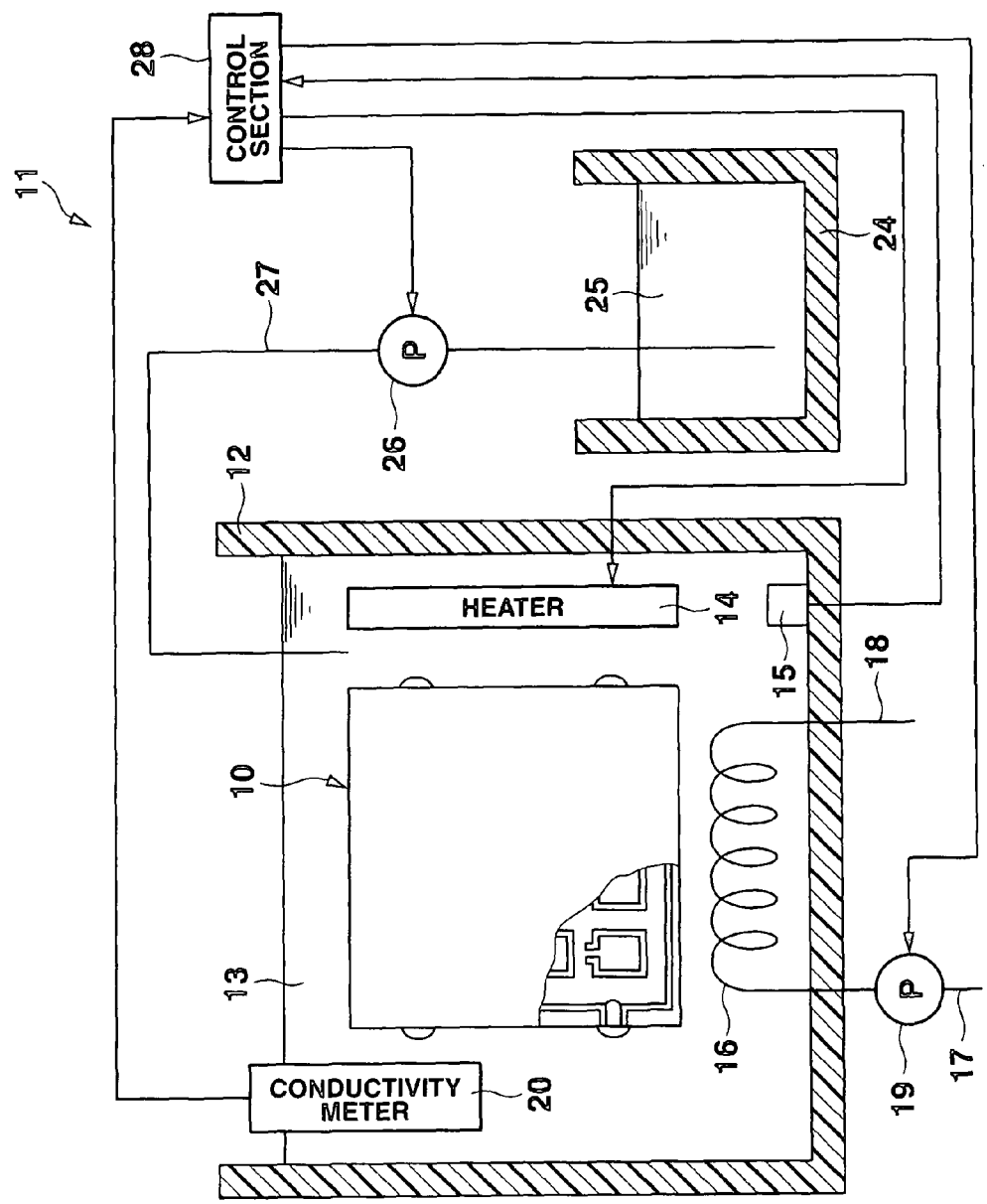
FIG. 17 is a schematic block diagram of another example of the etching apparatus.

FIG. 17 is a schematic block diagram of another example of the etching apparatus 11. The etching apparatus 11 is different from the etching apparatus 11 of FIG. 4 in that the conductivity meter 20 is disposed in the etching solution 13 within the etching bath 12, and the sampling pipe 21, the sampling pump 22 and the etching-solution recovery pipe 23 are omitted. Adopting this structure eliminates the need for the sampling pipe 21, the sampling pump 22 and the etching-solution recovery pipe 23, and achieves a simple configuration.

Figure 18:
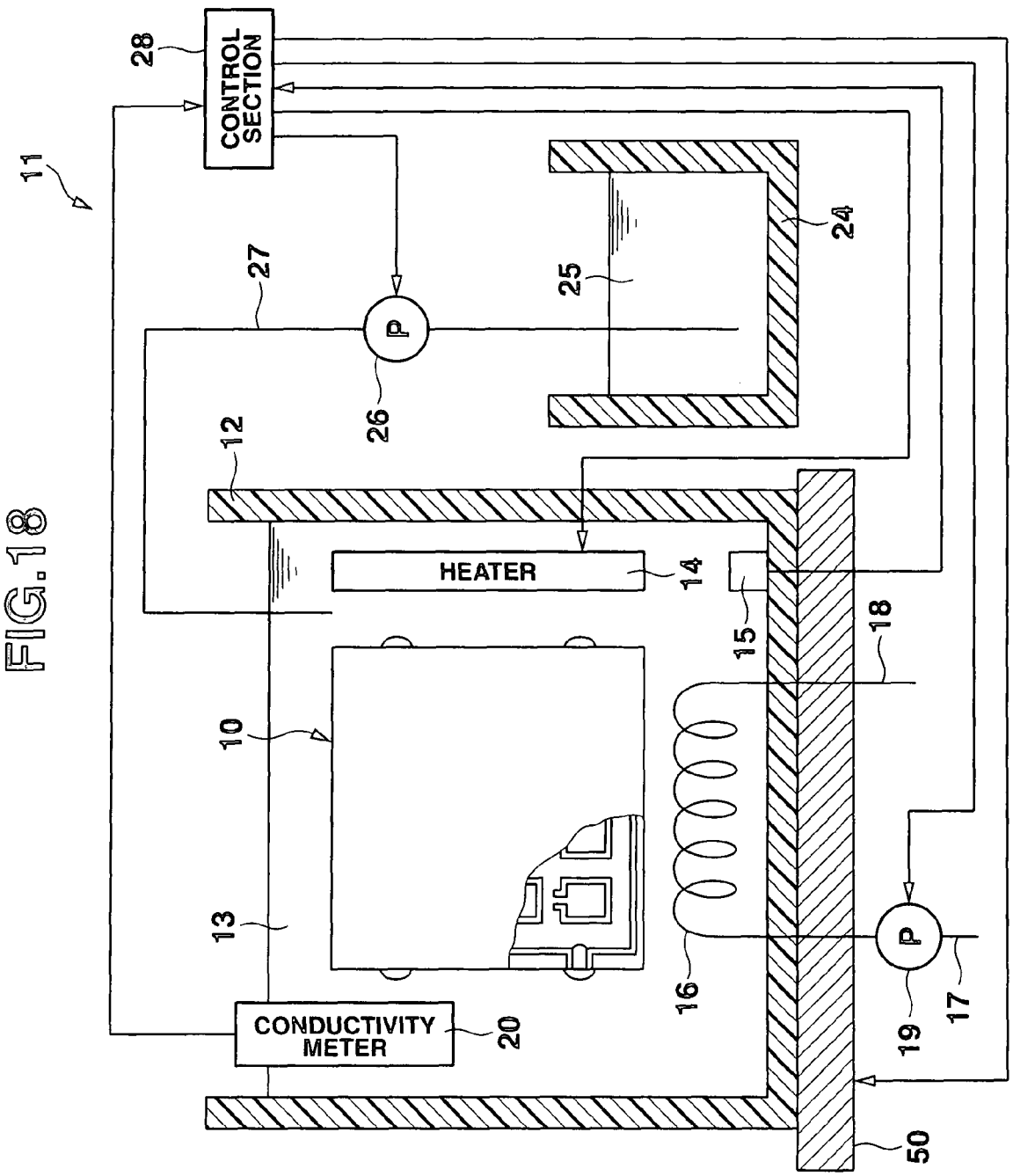
FIG. 18 is a schematic block diagram of an example of the etching apparatus having shaking means.

Moreover, as illustrated in FIG. 18, the etching apparatus 11 illustrated in FIG. 4 or the etching apparatus 11 illustrated in FIG. 17 may have a structure in which the etching bath 12 is placed and fixed on shaking means 50, and etching is performed while the etching bath 12 is shaken vertically and/or horizontally. Adopting this structure makes the temperature and the concentration of the etching solution 13 in the etching bath 12 more uniform throughout the etching solution 13 in the etching bath 12.

Figure 19:
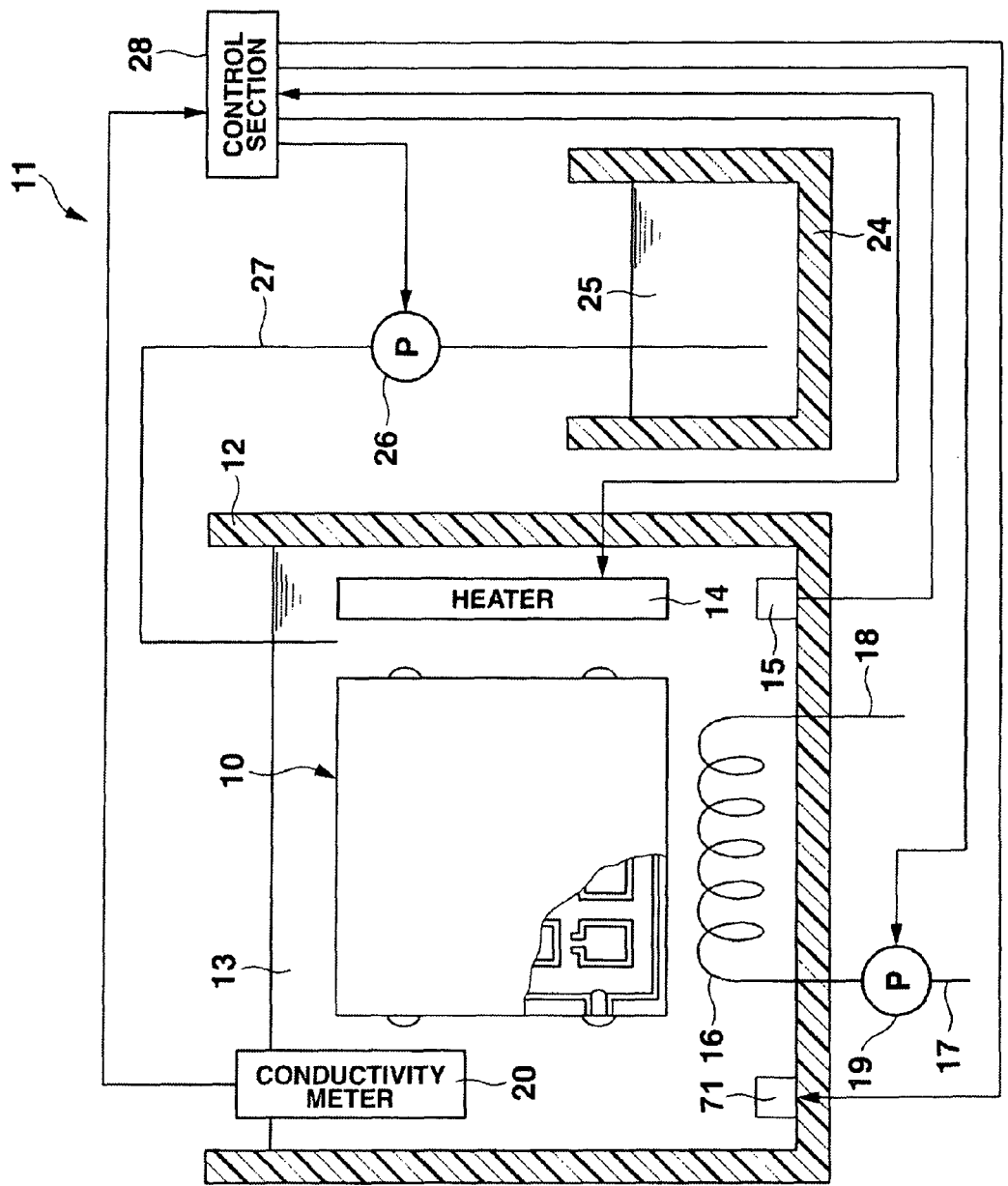
FIG. 19 is a schematic block diagram of an example of the etching apparatus having ultrasonic vibration means.

Further, as illustrated in FIG. 19, the etching apparatus 11 illustrated in FIG. 4 or the etching apparatus 11 illustrated in FIG. 17 may have a structure in which etching is performed while the etching solution 13 in the etching bath 12 is vibrated by ultrasonic waves by using ultrasonic vibration means 71. In this structure, the control section 28 controls operation of the ultrasonic vibration means 71. There are cases where etching is locally delayed due to adhesion of air bubbles, which are generated in the etching bath 12 by the etching, to the surfaces of the glass substrates 1 and 2. By adopting the structure of the etching apparatus with the ultrasonic vibration means 71, air bubbles adhered to the surfaces of the glass substrates 1 and 2 are removed by ultrasonic vibration, and adhesion of air bubbles is prevented. Further, the above structure enables easy removal of organic soil adhered to the surfaces of the glass substrates 1 and 2.

What is claimed is:

1. A method of manufacturing a liquid crystal display apparatus, comprising:
preparing at least one assembly for forming a plurality of finished liquid crystal display apparatuses, the at least one assembly including a pair of glass substrates opposing each other, a space being provided between the pair of glass substrates, and a periphery of the space between the pair of glass substrates being sealed by an outer peripheral seal member, wherein said pair of glass substrates have an area sufficient to form said plurality of finished liquid crystal display apparatuses, and are bonded to each other by: (i) a plurality of single-element seal members, which are interposed between the pair of glass substrates and each of which surrounds a display region for one of the finished liquid crystal display apparatuses, and (ii) the outer peripheral seal member which is provided around the plurality of single-element seal members;

etching outer surfaces of the pair of glass substrates by soaking the at least one assembly in an etching solution within an etching bath;
thereafter flattening the etched outer surfaces of the pair of glass substrates by polishing the outer surfaces of the pair of glass substrates, wherein the polishing includes performing mechanical polishing and performing chemical mechanical polishing after performing the mechanical polishing; and
thereafter cutting the at least one assembly into a plurality of individual ones of the finished liquid crystal display apparatuses,
wherein the cutting the at least one assembly includes a first cutting to obtain a plurality of secondary assemblies each having a strip shape, each of the secondary assemblies including a plurality of the single-element seal members.

2. The method according to claim 1, wherein at least two said assemblies are simultaneously etched.

3. The method according to claim 1, wherein the preparing the at least one assembly includes:
preparing at least one said pair of glass substrates; and
forming the at least one assembly by sealing the periphery of the space between the pair of glass substrates with the outer peripheral seal member.

4. The method according to claim 1, wherein performing the mechanical polishing comprises using one of $SiC$, $Al_2O_3$, $SiO_2$, and C as a polishing material, and performing the chemical mechanical polishing comprises using $CeO_2$ as a polishing material.

5. The method according to claim 4, wherein the chemical mechanical polishing is performed to flatten the outer surfaces of the pair of glass substrates using pure water including the polishing material.

6. The method according to claim 1, wherein the preparing the at least one assembly includes:
bonding the pair of glass substrates to each other by the outer peripheral seal member while at least one opening is provided to connect the space between the pair of glass substrates and inside of the outer peripheral seal member to outside of the outer peripheral seal member, and thereafter sealing the at least one opening with a sealing material.

7. The method according to claim 6, further comprising:
cutting a peripheral portion of the pair of glass substrates in which the sealing material is provided away from the at least one assembly so as to remove the sealing material interposed between the pair of glass substrates after the chemical mechanical polishing and before the cutting the at least one assembly.

8. The method according to claim 6, wherein the sealing material is provided on opposed sides of the pair of glass substrates.

9. The method according to claim 1, wherein the cutting the at least one assembly further includes a second cutting to cut each of the secondary assemblies into the plurality of individual ones of the finished liquid crystal display apparatuses.

10. The method according to claim 9, wherein:
each of the single-element seal members is provided with a liquid crystal injection port to connect an outside and an inside of the single-element seal member, and
the method further comprises injecting liquid crystal into the single-element seal members through the liquid crystal injection ports after the obtaining of the secondary assemblies and before the cutting of each of the secondary assemblies into the plurality of individual ones of the finished liquid crystal display apparatuses, and then sealing the liquid crystal injection ports.

11. The method according to claim 9, wherein:
each of the single-element seal members is provided with a liquid crystal injection port to connect an outside and an inside of the single-element seal member, and
the method further comprises injecting liquid crystal into the single-element seal members through the liquid crystal injection ports after cutting each of the secondary assemblies into the plurality of individual ones of the finished liquid crystal display apparatuses, and then sealing the liquid crystal injection ports.

12. The method according to claim 1, wherein the etching is performed while maintaining a temperature and a concentration of the etching solution within the etching bath at a substantially constant temperature and at a substantially constant concentration.

13. The method according to claim 12, wherein the etching includes reducing a thickness of each of the pair of glass substrates by soaking the pair of glass substrates in the etching solution for a time corresponding to a desired etching thickness.

14. The method according to claim 12, wherein the etching solution comprises a hydrofluoric-acid-based aqueous solution, and the maintaining of the concentration of the etching solution within the etching bath at the substantially constant concentration comprises detecting a concentration of hydrofluoric acid in the etching solution within the etching bath by a concentration detection mechanism, and supplying hydrofluoric acid to the etching bath, based on a concentration detection result of the concentration detection mechanism.

15. The method according to claim 12, wherein the etching includes shaking the etching bath.

16. The method according to claim 12, wherein the etching includes vibrating the etching solution in the etching bath by ultrasonic waves.

17. The method according to claim 12, wherein the maintaining of the temperature of the etching solution within the etching bath at the substantially constant temperature comprises detecting the temperature of the etching solution within the etching bath by a temperature detection mechanism, and at least one of heating the etching solution by a heating mechanism and cooling the etching solution by a cooling mechanism, based on a temperature detection result of the temperature detection mechanism.

18. The method according to claim 17, wherein the at least one of the heating and the cooling is controlled by proportional integral differential (PID) control.

19. A method of manufacturing a liquid crystal display apparatus, comprising:
preparing at least one assembly for forming a plurality of finished liquid crystal display apparatuses, the at least one assembly including a pair of glass substrates opposing each other, a space being provided between the pair of glass substrates, and a periphery of the space between the pair of glass substrates being sealed by an outer peripheral seal member, wherein said pair of glass substrates have an area sufficient to form said plurality of finished liquid crystal display apparatuses, and are bonded to each other by: (i) a plurality of single-element seal members, which are interposed between the pair of glass substrates and each of which surrounds a display region for one of the finished liquid crystal display apparatuses, and (ii) the outer peripheral seal member which is provided around the plurality of single-element seal members;
etching outer surfaces of the pair of glass substrates by soaking the at least one assembly in an etching solution within an etching bath;
thereafter flattening the etched outer surfaces of the pair of glass substrates by polishing the outer surfaces of the pair of glass substrates, wherein the polishing includes performing mechanical polishing and performing chemical mechanical polishing after performing the mechanical polishing; and
thereafter cutting the at least one assembly to obtain a plurality of secondary assemblies each having a strip shape, each of the secondary assemblies including a plurality of the single-element seal members, and cutting each of the secondary assemblies into a plurality of individual ones of the finished liquid crystal display apparatuses.

* * * * *